United States Patent
Plummer et al.

(10) Patent No.: US 10,088,984 B2
(45) Date of Patent: Oct. 2, 2018

(54) DECISION BASED LEARNING

(71) Applicant: Brigham Young University, Provo, UT (US)

(72) Inventors: Kenneth J. Plummer, Orem, UT (US); Lane Fischer, Springville, UT (US); Richard Swan, Spanish Fork, UT (US); Michael C. Johnson, Spanish Fork, UT (US)

(73) Assignee: Brigham Young University, Provo, UT (US)

( * ) Notice: Subject to any disclaimer, the term of this patent is extended or adjusted under 35 U.S.C. 154(b) by 503 days.

(21) Appl. No.: 14/738,166

(22) Filed: Jun. 12, 2015

(65) Prior Publication Data

US 2015/0363692 A1     Dec. 17, 2015

Related U.S. Application Data

(60) Provisional application No. 62/011,293, filed on Jun. 12, 2014.

(51) Int. Cl.
  *G06F 3/0484*    (2013.01)
  *G06N 99/00*     (2010.01)
(52) U.S. Cl.
  CPC ......... *G06F 3/0484* (2013.01); *G06N 99/005* (2013.01)
(58) Field of Classification Search
  CPC ........ G06N 99/005; G06N 5/02; G06N 5/022; G06N 5/04; G06F 3/0484
  USPC .......................................................... 706/11
  See application file for complete search history.

(56) References Cited

U.S. PATENT DOCUMENTS

| | | | |
|---|---|---|---|
| 6,493,690 B2 | 12/2002 | Bertrand et al. | |
| 6,947,914 B2 | 9/2005 | Bertrand et al. | |
| 6,957,202 B2 | 10/2005 | Skaanning et al. | |
| 7,065,512 B1 * | 6/2006 | Bertrand | G09B 7/02 706/12 |
| 7,117,189 B1 * | 10/2006 | Nichols | G06F 9/4446 706/11 |
| 7,130,836 B2 | 10/2006 | Grosser et al. | |
| 7,194,444 B1 * | 3/2007 | Nichols | G09B 5/00 434/219 |
| 7,233,931 B2 | 6/2007 | Lee et al. | |

(Continued)

OTHER PUBLICATIONS

Stepien et al., "Problem-based learning: As authentic as it gets", Educational Leadership, Apr. 93, vol. 50, Issue 7.*

(Continued)

*Primary Examiner* — Dave Misir
(74) *Attorney, Agent, or Firm* — Brake Hughes Bellermann LLP

(57) ABSTRACT

A decision based learning apparatus can include a decision module configured to implement a decision model associated with a problem, the decision model including a plurality of decisions associated with solving the problem, a problem profile module configured to store a problem profile, the problem profile defining the problem and a solution to the problem, a learning storage module configured to store at least one learning module associated with at least one of the plurality of decisions, and a decision scenario interface module configured to generate a scenario based on the decision model and the problem profile and to present the scenario based on the decision model and the problem profile to a user.

15 Claims, 3 Drawing Sheets

(56) References Cited

U.S. PATENT DOCUMENTS

| | | | |
|---|---|---|---|
| 7,574,329 B1* | 8/2009 | Matheson | G06F 9/4428 |
| | | | 703/1 |
| 8,065,326 B2 | 11/2011 | Li et al. | |
| 8,296,247 B2 | 10/2012 | Zhang et al. | |
| 8,360,787 B2 | 1/2013 | Zorba, Sr. et al. | |
| 8,412,548 B2 | 4/2013 | Benayon et al. | |
| 2002/0090595 A1 | 7/2002 | Hubbell et al. | |
| 2002/0183988 A1* | 12/2002 | Skaanning | G06F 17/10 |
| | | | 703/2 |
| 2003/0041040 A1* | 2/2003 | Bertrand | G09B 7/00 |
| | | | 706/12 |
| 2003/0084015 A1* | 5/2003 | Beams | G09B 5/14 |
| | | | 706/47 |
| 2006/0046237 A1* | 3/2006 | Griffin | G06Q 10/0639 |
| | | | 434/322 |
| 2006/0234201 A1 | 10/2006 | Pierson, III et al. | |
| 2007/0179966 A1* | 8/2007 | Li | G06F 17/30539 |
| 2009/0012761 A1* | 1/2009 | Bertrand | G06N 5/042 |
| | | | 703/6 |
| 2009/0042175 A1* | 2/2009 | Zorba | G06Q 20/102 |
| | | | 434/323 |
| 2009/0157582 A1 | 6/2009 | Kuester et al. | |
| 2013/0110473 A1* | 5/2013 | Cantu | G06N 5/003 |
| | | | 703/2 |
| 2013/0322741 A1 | 12/2013 | Lee et al. | |
| 2016/0155346 A1* | 6/2016 | Wang | G09B 19/00 |
| | | | 434/353 |

OTHER PUBLICATIONS

Aha et al., "Instance-Based Learning Algorithms", Machine Learning, 6, pp. 37-66, 1991.*
Gallagher S., "Problem-Based Learning", Journal for the Education of the Gifted, 1997.*
Stepien, William et al., "Problem-based learning: As authentic as it gets", Educational Leadership, vol. 50, Issue 7, Apr. 1993, 5 pages.
Aha, David W. et al., "Instance-Based Learning Algorithms", Machine Learning, vol. 6, pp. 37-66, 1991.
Gallagher, S. A. (1997). Problem-based learning. Journal for the Education of the Gifted, 20(4), 332-62.

* cited by examiner

US 10,088,984 B2

DECISION BASED LEARNING

This application claims the benefit of U.S. Provisional Patent Application 62/011,293 filed on Jun. 12, 2014 entitled "DECISION BASED LEARNING", the entire contents of which is incorporated herein by reference.

FIELD

Embodiments relate to decision based learning using a software implementation tool.

BACKGROUND

A problem can be presented to a learner (a user of a software tool). The learner can be presented with at least one scenario that may require them to make at least one decision in order to reach a next decision point, and so on, until the learner reaches a resolution to the problem. This process can be used for many learners and/or repeated for a learner in order to teach the learner to resolve (e.g., find the best solution to) the problem.

SUMMARY

In a general aspect, a decision based learning apparatus can include a decision module configured to implement a decision model associated with a problem, the decision model including a plurality of decisions associated with solving the problem, a problem profile module configured to store a problem profile, the problem profile defining the problem and a solution to the problem, a learning storage module configured to store at least one learning module associated with at least one of the plurality of decisions, and a decision scenario interface module configured to generate a scenario based on the decision model and the problem profile and to present the scenario based on the decision model and the problem profile to a user.

In another general aspect, a non-transitory computer readable medium includes code segments that, when executed by a processor, cause the processor to implement a decision model associated with solving a problem, the decision model including a plurality of decisions associated with solving the problem, store a problem profile, the problem profile defining the problem and a solution to the problem, store at least one learning module associated with at least one of the plurality of decisions, generate a scenario based on the decision model and the problem profile and to present the scenario based on the decision model and the problem profile to a user, provide an authoring tool configured to generate the decision model, to generate the problem profile, and to associate the at least one learning module to a corresponding at least one of the plurality of decisions, and provide a reporting and scoring interface configured to allow viewing of a progress of the user, and view, edit and report a score associated with the user.

Implementations can include one or more of the following features. For example, the decision based learning apparatus can further include an authoring interface module configured to generate the decision model, to generate the problem profile, and configured to associate the at least one learning module to a corresponding at least one of the plurality of decisions and a reporting and scoring interface configured to allow viewing of a progress of the user, and view, edit and report a score associated with the user. The decision based learning apparatus can further include a graphical user interface (GUI) through which the user, as a first user, interacts with the decision based learning apparatus and a second user configures the decision based learning apparatus, wherein the first user is a learner and the second user is an instructor.

For example, the decision model can correspond to a decision-making process of a subject matter expert associated with solving the problem, and the decision model can be based on a structure associated with a presentation of information for each of the of the plurality of decisions and a decision path corresponding to the presentation of information. The problem profile can define a structure of at least one scenario related to the solution of the problem, and the problem profile can include information related to a characteristic of the problem and an indication a preferred path through the decision model.

For example, the decision scenario interface module can be further configured to receive, via a GUI, input associated with the user, interpret the input associated with the user, and track a progress of the user. The at least one learning module can include a media file. The one or more of the plurality of decisions can define a decision path between the problem and the solution to the problem. The decision model, the problem profile and the scenario can be implemented in a data-structure of a database.

In yet another general aspect, a decision based learning apparatus can include a Decision-Based Learning Markup Language (DBLML) module. The DBLML can be configured to define a decision module configured to implement a decision model associated with solving a problem, the decision model including a plurality of decisions associated with solving the problem, a problem profile module configured to store a problem profile, the problem profile defining the problem and a scenario indicating a solution to the problem, a decision engine module configured to read the problem profile and an associated decision model from the DBLML module, and an authoring tool configured to generate the decision model, to generate the problem profile, and configured to associate the at least one learning module to a corresponding at least one of the plurality of decisions.

Implementations can include one or more of the following features. For example, the decision model can include a contextual component and an instructional component, the decision engine module can be further configured to present the contextual component and the instructional component to a user, and the decision engine module can be further configured to interpret input from the user, and track a progress through the decision model of the user. For example, the decision based learning apparatus can further include a graphical user interface (GUI) through which a first user interacts with the decision based learning apparatus and a second user configures the decision based learning apparatus, wherein the first user is a learner and the second user is an instructor.

For example, the decision model can corresponds to a decision-making process of a subject matter expert associated with solving the problem, and the decision model can be based on an algorithmic structure associated with a presentation of information for each of the of the plurality of decisions and a decision path corresponding to the presentation of information. The problem profile can define a structure of at least one scenario related to the solution of the problem, and the problem profile includes information related to a characteristic of the problem and an indication a preferred path through the decision model. The decision engine can be further configured to receive, via a GUI, input associated with a user, interpret the input associated with the user, and track progress of the user. One or more of the plurality of decisions can define a decision path between the problem and the solution to the problem. The decision model, the problem profile and the scenario can be defined in a data-structure of a markup language file.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
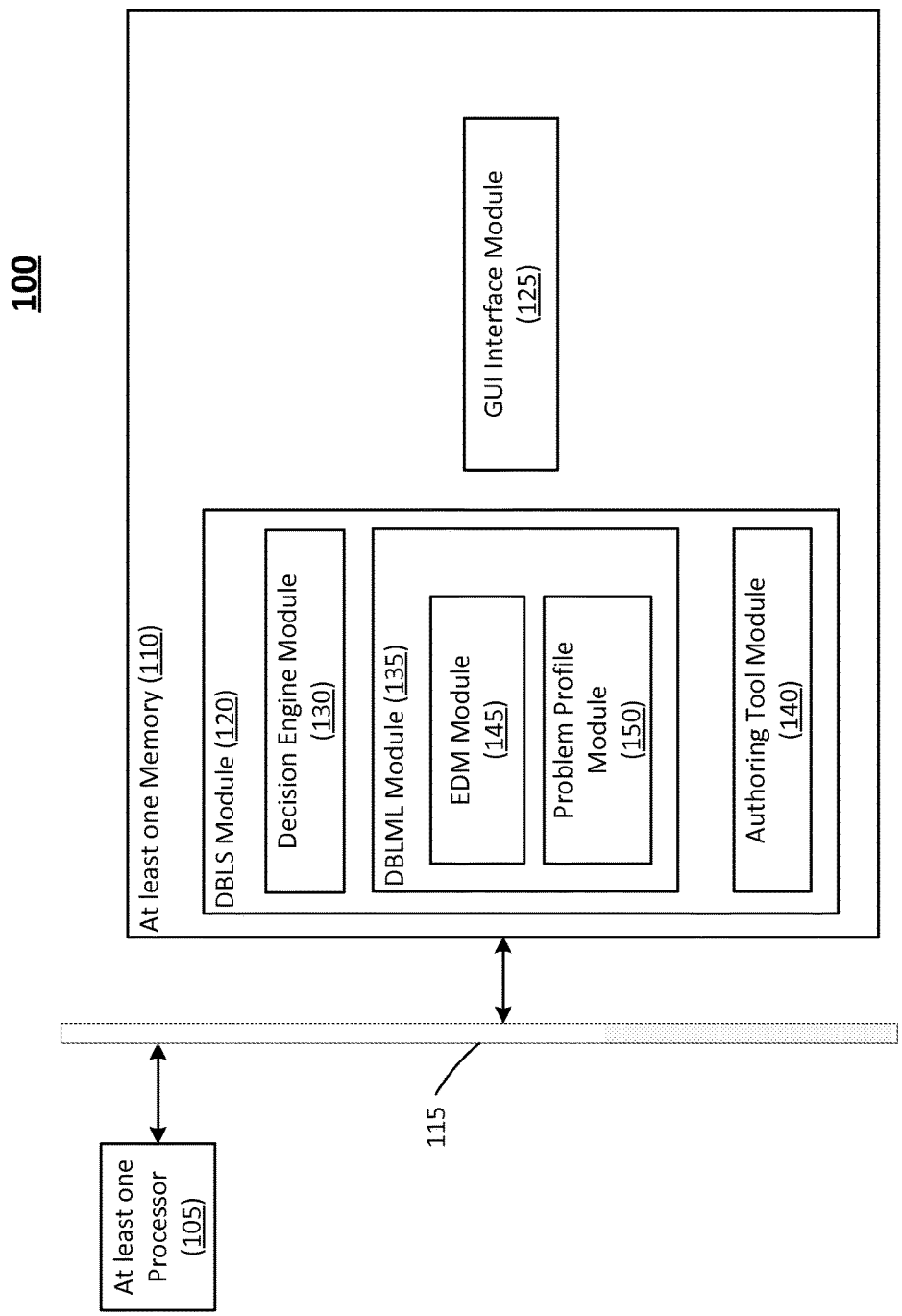
FIG. 1 is a block diagram of a system according to at least one example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims.

According to at least one example embodiment, Decision-Based Learning Software (DBLS) may include a Decision-Based Learning Markup Language (DBLML), a desktop (e.g., a browser plug-in), and mobile versions of a Decision Engine that interprets and renders DBLML and handles user interactions. DBLS may be based on an instructional design methodology of Decision-Based Learning.

Decision-Based Learning may be based on a process of creating a model of expert decision-making in a content domain. Content knowledge may be organized and associated with decision points within an expert decision model. A learner can be presented with a scenario that may require the learner to make at least one decision in order to reach the next decision point, and so on, until the learner reaches a problem resolution. A scenario can be related to a problem-problem resolution and/or a decision for the decision point. For example, a scenario related to a problem-problem resolution can define the information (e.g., knowledge, data, criteria, causes, and the like) associated with a problem, the information associated with a possible resolution(s) of the problem and a possible decision(s) that can be made that lead to the resolution of the problem. For example, a scenario related to a decision point can be information associated with making the decision associated with the decision point. The information can be related to knowledge of the decision maker (e.g., expert and/or learner) and/or related to knowledge attainable (e.g., through training) of the decision maker. The information can also be problem related (e.g., data, criteria, causes, and the like).

Learners who cannot proceed due to lack of knowledge or procedural skill access the content knowledge or practice the procedure at the associated decision point in order to make a preferred (e.g., knowledgeable and/or skilled) decision. Learners may repeat the process multiple times with different scenarios until proficiency may be achieved. Proficiency can be achieved when the learner acquires enough knowledge or procedural skill such that the learner makes decisions that lead to a progression through a preferred path (described below) to the problem resolution. In other words, proficiency can be a convergence on a preferred path (as pre-defined by, for example, a subject matter expert or teacher) to the solution to the problem.

In a first implementation, a DBLS may include three elements: (1) A DBLML, (2) a Decision Engine, and (3) an Authoring Tool. The DBLML may permit the definition or characterization of two components: (1) An Expert Decision Model and (2) a Problem Profile.

FIG. 1 is a block diagram of a system according to at least one example embodiment. As shown in FIG. 1, a system (apparatus and/or learning apparatus) 100 includes at least one memory 110. The at least one memory 110 includes a DBLS module 120 and a Graphical User Interface (GUI) module 125. The DBLS module 120 includes a decision engine module 130, a DBLML module 135 and an authoring tool module 140. The DBLML module 135 includes an Expert Decision Model (EDM) module 145 and a problem profile module 150. The DBLS module 120 and the DBLML module 135 may be implemented in a data-structure of a markup language file. Accordingly, the decision engine module 130, the authoring tool module 140, the EDM module 145 and the problem profile module 150 may be implemented in a data-structure of a markup language file.

The system 100 further includes at least one processor 105 and a bus 115. The at least one processor 105 and the at least one memory 110 are communicatively coupled via the bus 115. The system 100 may be, for example, an element of a computing device (e.g., a personal computer, a mobile device, a cloud computing device, a server and/or the like).

In the example of FIG. 1, the system 100 may be at least one computing device and should be understood to represent virtually any computing device configured to perform the techniques described herein. As such, the system 100 may be understood to include various standard components which may be utilized to implement the techniques described herein, or different or future versions thereof. By way of example, the system 100 is illustrated as including the at least one processor 105 (e.g., a silicon based processor), as well as the at least one memory 110 (e.g., a non-transitory computer readable medium or storage medium) respectively.

The at least one processor 105 may be utilized to execute instructions stored on the at least one memory 110, so as to thereby implement the various features and functions described herein, or additional or alternative features and functions. The at least one processor 105 and the at least one memory 110 may be utilized for various other purposes. For example, the at least one processor 105 and the at least one memory 110 may be shared resources within the system 100. The at least one memory 110 may represent an example of various types of memory and related hardware and software which might be used to implement any one of the modules described herein. Systems and/or techniques described below may include data and/or storage elements. The data and/or storage elements (e.g., data base tables) may be stored in, for example, the at least one memory 110.

The Expert Decision Model (EDM) module 145 may be configured to implement at least one EDM. The EDM may be created by a subject-matter expert (SME). In contrast to more standard forms of organization based around logical relationships, the EDM may be organized around the decision-making process of an expert to accomplish a real-world task or reach a solution to a real-world problem. The EDM may provide the structure (e.g., decision nodes and links (or edges) between decision nodes) for the decision engine to interpret and render the scenario and to direct user interaction. The EDM may also contain pointers (e.g., references to a memory location) to the associated Instructional Components. Instructional Components may contain the subject-matter content to inform the learner's reasoning at the given decision point. These may consist of text, images, video, audio, or other digital resources.

The problem profile module 150 may be configured to implement a problem profile. The problem profile may define the structure of an individual scenario. This profile may include information about the characteristics of the problem as well as indicators for the correct and/or most appropriate pathway through the EDM. Accordingly, the problem profile may define a structure (e.g., nodes, edges and links between nodes) of an individual scenario including a definition of the problem (or task), a definition of the solution to the problem (or completion of the task) and at least one decision. The at least one decision may also include at least one instructional component (e.g., media files and the like).

The Decision Engine module 130 may be configured to analyze (e.g., read, process) a problem profile and an associated EDM from the DBLML module 135. The Decision Engine module 130 may be further configured to present the Contextual Components and Instructional Components as appropriate, interpret learner input, and track learner progress through the EDM. The Decision Engine module 130 may be software (e.g., program code executed by the at least one processor 105).

The authoring tool module 140 may be configured to facilitate generation of Expert Decision Models, Problem Profiles, and attach Instructional and Contextual Components. For example, the authoring tool module 140 may allow an instructor to create Expert Decision Models, Problem Profiles, and attach Instructional and Contextual Components. The GUI interface module 125 may be configured to generate a user interface for display on (e.g., on a display associated with) and interaction with the computer system 100. The GUI interface module 125 may be configured to generate a GUI based on current use of the system 100. For example, a student may be presented a different GUI than an instructor.

In another implementation, a DBLS may include six elements: (1) an Expert Decision Model (EDM), (2) at least one Problem Profile, (3) at least one Learning Module, (4) a Decision-based Scenario Interface, (5) an Authoring Interface, and (6) a Reporting and Scoring Interface. The software can be based on and/or facilitate a pedagogical model of Decision-based Learning.

Figure 2:
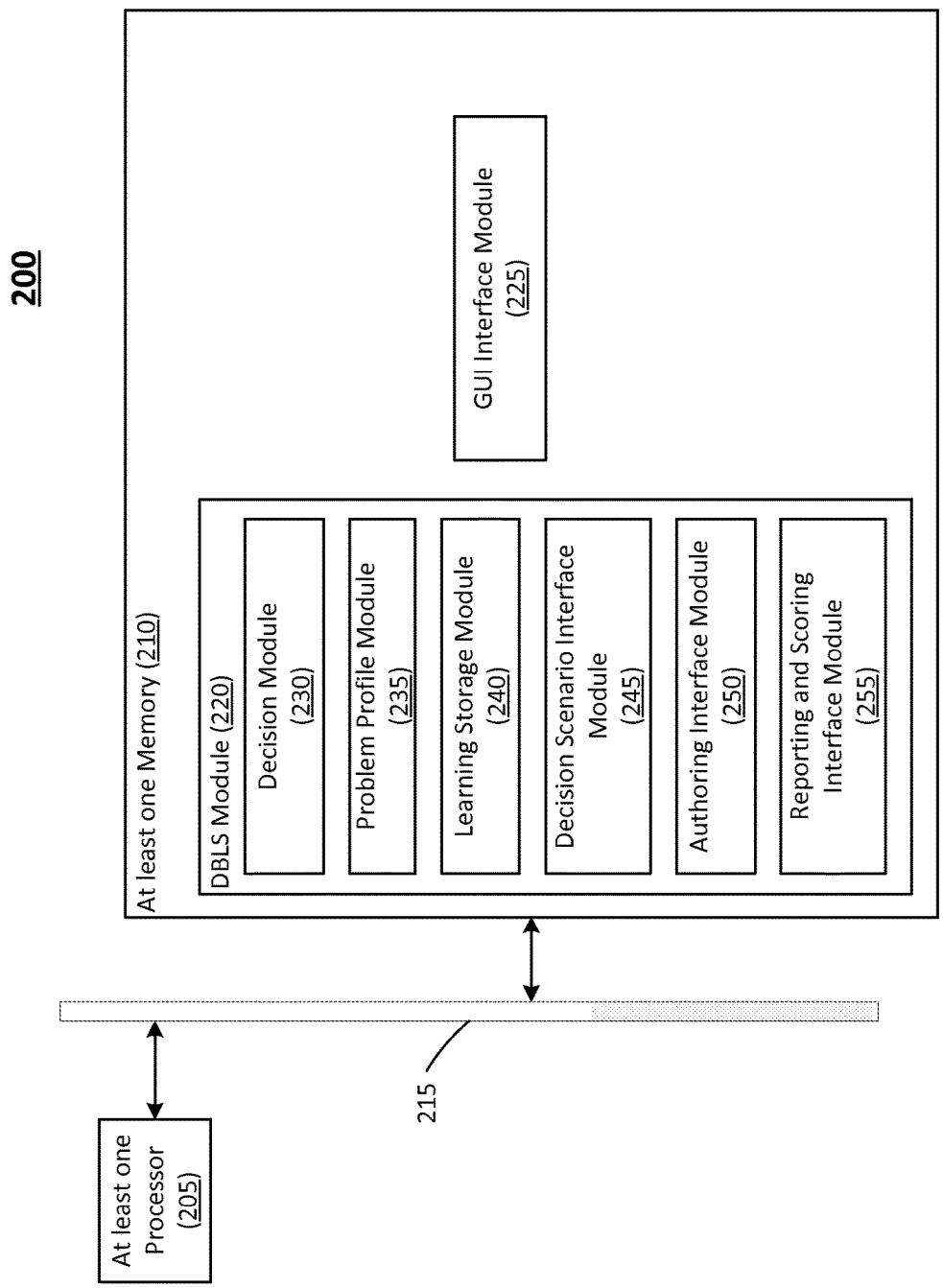
FIG. 2 is a block diagram of another system according to at least one example embodiment.

FIG. 2 is a block diagram of another system according to at least one example embodiment. As shown in FIG. 2, the system (apparatus and/or learning apparatus) 200 includes at least one processor 205 and at least one memory 210. The at least one processor 205 and the at least one memory 210 are communicatively coupled via bus 215. The system 200 may be, for example, an element of a computing device (e.g., a personal computer, a mobile device, a cloud computing device or a server).

In the example of FIG. 2, the system 200 may be at least one computing device and should be understood to represent virtually any computing device configured to perform the methods described herein. As such, the system 200 may be understood to include various standard components which may be utilized to implement the techniques described herein, or different or future versions thereof. By way of example, the system 200 is illustrated as including the at least one processor 205 (e.g., a silicon based processor), as well as the at least one memory 210 (e.g., a non-transitory computer readable storage medium) respectively.

Thus, as may be appreciated, the at least one processor 205 may be utilized to execute instructions stored on the at least one memory 210, so as to thereby implement the various features and functions described herein, or additional or alternative features and functions. Of course, the at least one processor 205 and the at least one memory 210 may be utilized for various other purposes. In particular, it may be appreciated that the at least one memory 210 may be understood to represent an example of various types of memory and related hardware and software which might be used to implement any one of the modules described herein. Systems and/or methods described below may include data and/or storage elements. The data and/or storage elements (e.g., database tables) may be stored in, for example, the at least one memory 210.

As shown in FIG. 2, the at least one memory 210 includes a DBLS module 220 and a GUI interface module 225. The DBLS module 220 may be configured to generate an instructional design based on Decision-Based Learning. The GUI interface module 225 generate a graphical user interface configured to present user input/output information on a display associated with the system 200 and to receive input to and output from the DBLS module 220.

The DBLS module 220 includes a decision module 230, a problem profile module 235, a learning storage module 240, a decision scenario interface module 245, an authoring interface module 250 and a reporting and scoring interface module 255. The DBLS module 220 may be implemented in a data-structure of a database. Therefore, the decision module 230, the problem profile module 235, the learning storage module 240, the decision scenario interface module 245, the authoring interface module 250 and the reporting and scoring interface module 255 may be implemented in a data-structure of a database The decision module 230 may be configured to implement an Expert Decision Model (EDM). The EDM may be created by a subject-matter expert (SME). In contrast to more standard forms of organization based around logical relationships, the EDM can be organized around the decision-making process of an expert to accomplish a real-world performance or solution. The EDM can provide a structure (e.g., training modules, decision nodes and links (or edges) between decision nodes) for the presentation of information and the flow of interaction.

The problem profile module 235 may be configured to store at least one problem profile. A problem profile may define the structure of an individual scenario. This profile can include information about the characteristics of the problem as well as indicators for the correct, or optimal, pathway through the EDM. The problem profile module 235 may include a database structure configured to store the at least one problem profile. The problem profile module 235 may include a mechanism by which a problem profile can be generated. For example, the problem profile module 235 may include an input mechanism (e.g., using the GUI interface module 125) configured to generate new and/or modifying existing problem profiles. In other words, the problem profile module 235 may use the database structure as a basis for a GUI that allows for generating new and/or modifying existing problem profiles.

The learning storage module 240 may be configured to store at least one learning module (e.g., learning module 315-1, 315-2, etc.). A learning module can provide on-demand information to enable the user to distinguish between decision options. The on-demand information can be displayed to the user (e.g., learner, student, trainee, and/or the like) via a user interface. For example, the user interface may be a graphical user interface (GUI) configured to display a media file including the information. For example, the user interface may be a GUI configured to request a live presentation and/or text including the information. In other words, the learning module can provide just-in-time (e.g., on-demand), just-enough (e.g., concise) information to distinguish between decision options with the ability to access more expansive information. The learning storage module 240 may include a database structure configured to store the at least one learning module. The learning storage module 240 may include and/or be associated with a mechanism by which a learning module can be generated. For example, a learning module can include a media file (e.g., video and/or audio file) developed using media production software. A learning module may include related and/or linked to decision points.

The decision scenario interface module 245 may be configured to read a problem profile from the problem profile module 235 and an associated EDM from the decision module 230. The decision scenario interface module 245 may be further configured to generate (or read) and present a scenario based on the EDM and the problem profile to a learner (e.g., via the GUI interface module 225). The decision scenario interface module 245 may be configured to receive learner input, interpret the learner input, and track learner progress.

The authoring interface module 250 may be configured to generate an Expert Decision Model(s), a Problem Profile(s), and link Learning Module(s) to decision points. For example, the authoring interface module 250 may allow an instructor to create Expert Decision Models, Problem Profiles, and link Learning Modules to decision points. The GUI interface module 225 may be configured to generate a user interface for display on (e.g., on a display associated with) and interaction with the computer system 100. The GUI interface module 225 may be configured to generate a GUI based on current use of the system 200. For example, a student may be presented a different GUI than an instructor.

The reporting and scoring interface module 255 may be configured to allow the instructor (e.g., via the GUI interface module 225) to view student progress through problems, diagnose areas of strength and weakness, and view, edit and report scores.

In an example implementation associated with system 200, an instructor can design, generate and store an EDM, a problem profile and a learning module in association with each other. The EDM, the problem profile and the learning module can be stored in a database structure. For example, each of the EDM, the problem profile and the learning module can be stored in a separate data table (or data tables) and another table can store the relationship or association between the EDM, the problem profile and the learning module. Data (or information) stored in the data tables can include data associated with an algorithm, a decision path, nodes (e.g., decisions), diagrams and the like. Data (or information) stored in the data tables can also include pointers (e.g., memory references) to other information (e.g., images or video) associated with the EDM, the problem profile and/or the learning module. A student can then reference the EDM, the problem profile and/or the learning module in a learning environment. In other words, while the student uses a DBLS tool, the data (or information) is read from the database.

In contrast to more standard forms of educational organization based around logical relationships, a decision model may be organized around the decision-making process of an expert (e.g., subject matter expert) to accomplish a task (e.g., real-world task) or reach a solution (e.g., to a real-world problem). The decision model may provide a structure (e.g., decision nodes and links (or edges) between decision nodes) for in order to interpret and render a scenario (described below) and to direct user interaction. The decision model may also contain a pointer(s) (e.g., a reference(s) to a memory location) to an associated instructional component(s). An instructional component may contain subject-matter content to inform a user's (e.g., a learner) reasoning at a given decision point. An instructional component may include text, images, video, audio, or other digital resources.

Figure 3:
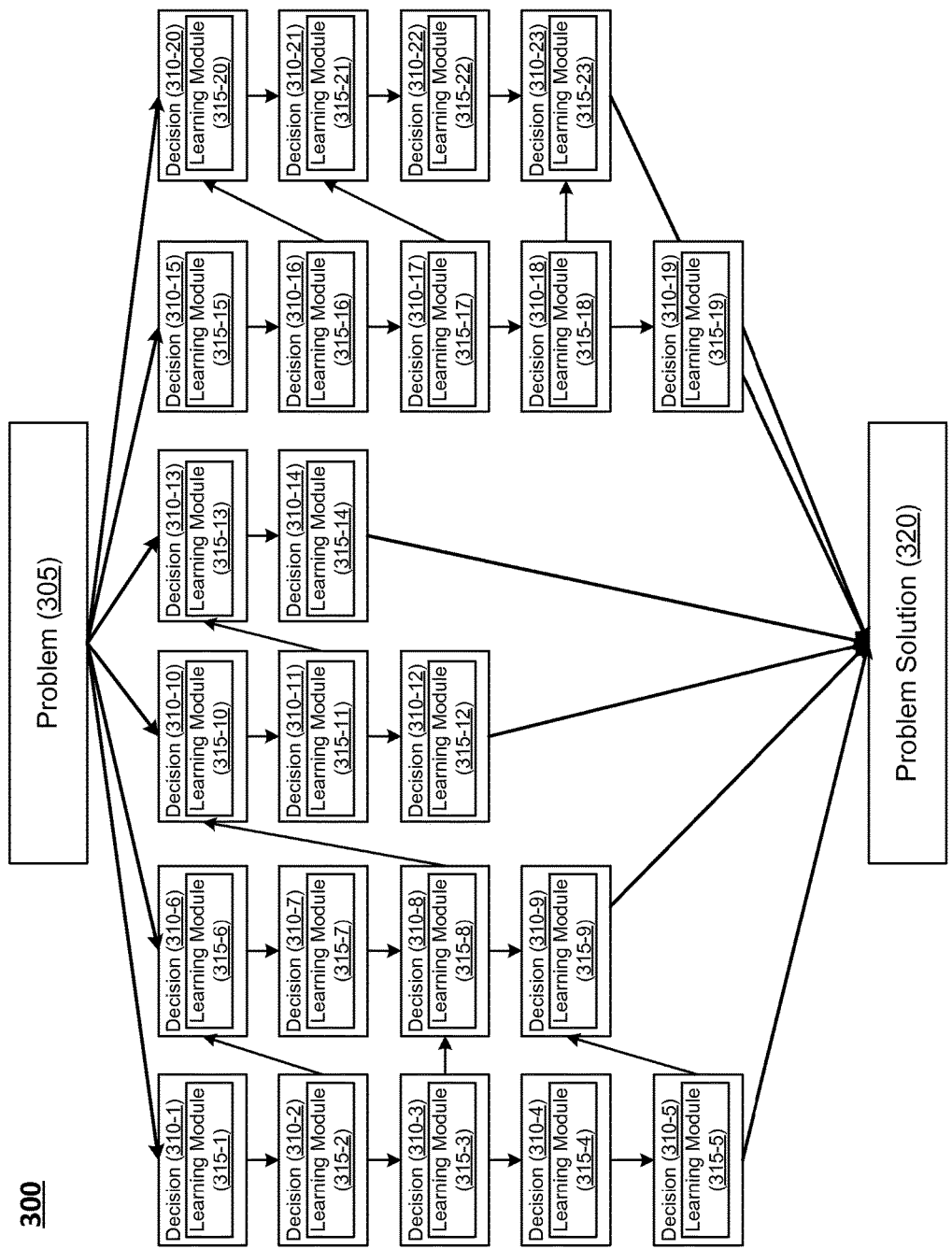
FIG. 3 illustrates a decision model according to at least one example embodiment.

FIG. 3 illustrates a decision model according to at least one example embodiment. As shown in FIG. 3, a decision model (or expert decision model or EDM) 300 can include a problem 305 (or be based on the problem 305) and a problem solution 320. In order to get to the problem solution 320, a learner makes a plurality of decisions. The plurality of decisions are illustrated in FIG. 3 as decision 310-1, 310-2, 310-3, 310-4, 310-5, 310-6, 310-7, 310-8, 310-9, 310-10, 310-11, 310-12, 310-13, 310-14, 310-15, 310-16, 310-17, 310-18, 310-19, 310-20, 310-21, 310-22, and 310-23. The learner can make decisions based knowledge, skills, education, experience, training and the like. The learner can use a user interface to register (e.g., input) the decision causing a transition to a next or subsequent decision point or node. A learner that is lacking in knowledge, skills, education, experience, training and the like may gain knowledge, skills, education, experience, training and the like using one or more of a plurality of learning modules (e.g., instructional components) associated with the decision 310-1 to 310-23. The plurality of learning modules are illustrated in FIG. 3 as learning modules 315-1, 315-2, 315-3, 315-4, 315-5, 315-6, 315-7, 315-8, 315-9, 315-10, 315-11, 315-12, 315-13, 315-14, 315-15, 315-16, 315-17, 315-18, 315-19, 315-20, 315-21, 315-22, and 315-23.

In order to get to the problem solution 320, the learner can make the plurality of decisions such that a decision path is followed via a plurality of links. A decision path can include at least one decision. In other words, a decision path can follow a nodal path where a decision (e.g., decision 310-1) is the node and an edge of the node links to another decision (e.g., decision 310-2). For example, a first decision path can include decisions 310-13 and 310-14. A second decision path can include decisions 310-6, 310-7, 310-8 and 310-9. Decision paths may include other decision paths. For example, a third decision may include the second decision path in that the third decision path can include decision 310-1, 310-2, 310-6, 310-7, 310-8 and 310-9.

In an example implementation, a preferred, best or ideal decision path (hereinafter preferred path) may exist. For example, the preferred path may be pre-defined (stored and/or indicated) in association with the decision model by, for example, the subject matter expert. In an example implementation, the preferred path may be the shortest decision path or the decision path with the fewest decisions. In the example of FIG. 3, the first decision path (including decisions 310-13 and 310-14) may be the preferred path. A learner may follow many decision paths during a learning process before making the decisions that lead to the preferred path. In other words, the learner may choose (and learn from) decision path two and decision path three before following decision path one to the problem solution 320.

When the learner acquires enough knowledge or procedural skill such that the learner makes decisions that converge toward a progression through a preferred path to the problem resolution, the learner is demonstrating the learning of the content. In other words, a convergence on a preferred path (as pre-defined by, for example, a subject matter expert or teacher) to the solution to the problem shows learning progress. This learning progress can be displayed to the user (e.g., learner and/or teacher) via, for example, the reporting and scoring interface module 255. This learning progress can be displayed to the user via a graphical user interface (GUI). In other words, the reporting and scoring interface module 255 can use a measurement of the convergence on the preferred path as an indication of learning progress and display the progress on the GUI.

As part of the learning process, the learner may interact with the at least one of the plurality of learning modules 315-1 to 315-23. Interacting with the at least one of the plurality of learning modules 315-1 to 315-23 may include watching a video, reading content, interacting with an instructor, searching for information based on provided keywords, building a product, performing some action and the like. From the interacting with the at least one of the plurality of learning modules 315-1 to 315-23, the user may gain some knowledge that will aid in making the decision. A software tool (e.g., a DBLS) based on the decision model may be configured educate a learner by selecting a non-preferred path (e.g., a decision path other than decision path one) in order to expose the learner to the non-preferred path and the consequences of choosing the non-preferred path in the controlled environment of the software tool. In this way, a learner can go through a trial and error process as the learner becomes more and more familiar with the concepts, theories, models, procedures that inform better decisions.

It is not enough for a learner or student (e.g., university students and/or corporate trainees) to simply be exposed to concepts and different views of thinking or traipsing through textbooks gaining knowledge in a piece-meal fashion. Accordingly, teaching in a way that more effectively presents theories, models, frameworks, concepts to assist learners in practicing expert decision-making processes is a paramount challenge that DBLS is can achieve.

Cognitive psychologists have found two important elements accounted for in effective course design: (1) making explicit the framework of a content domain and (2) providing authentic learning experiences. As a learner develops a framework of course content the learner can place new pieces of information within these frameworks or restructure the frameworks themselves in order to accommodate the new information. Structured or connected knowledge can be considered important to all learning. These structures take the load off working memory as thousands of bits of information are placed into a working framework.

A premium has been placed on courses that engender authentic learning tasks that are based on real-life problems considering authenticity to be the driving force for learning. Such authenticity has the potential to help student bring to bear their cognitive structures on meaningful real-world tasks.

Very few, if any, course design options combine these two elements in a meaningful way. Most courses disseminate a vast array of information to students without arming them with and working through an explicit framework. Traditional instruction can be organized around logical relationships within the subject matter. Decision-Based Learning may be organized around the decision-making process of an expert and the concepts that inform a given decision.

Example embodiments provide a technology tool that allows instructors to create expert decision models and associated instruction and practice. Potential users may include learners and instructors in secondary/higher education and corporate as well as nonprofit training. For example, university or secondary faculty could use DBLS as a replacement or supplement to textbooks. DBLS can be used as a stand-alone educational product or in conjunction with classroom instruction.

The DBLS approach draws on programmed instruction which can involve segmenting complex skills into their subcomponent parts, with each component taught to mastery in a series of steps in which prompting is initially provided frequently and then gradually, systematically, and completely faded.

As an example, a program called ALEKS, (Assessment and LEarning in Knowledge Spaces) is a Web-based, artificially intelligent assessment and learning system. ALEKS can adapt the instruction based on learner responses to assessment items. DBLS may combine ALEKS like instruction with a more contextualized programmed instruction in a training environment. For example, case-based and problem-based learning approaches can encourage a learner to deduce expert decision models as the learner attempts to solve a problem.

Accordingly, an example embodiments (e.g., as described with regard to FIG. 1 and/or FIG. 2) can be implemented in software (e.g., code segments stored on a non-transitory computer readable medium) that, when executed by a processor, cause the processor to execute a decision based learning apparatus as a number of steps. The steps can include implementing a decision model associated with solving a problem. The decision model can include a plurality of decisions associated with solving the problem. Storing a problem profile, the problem profile can define the problem and a solution to the problem. Storing at least one learning module associated with at least one of the plurality of decisions. The at least one learning module can include (or point to) information (e.g., as textual, video and/or audio media) used to transfer knowledge to a learner. Generating a scenario based on the decision model and the problem profile and to present the scenario based on the decision model and the problem profile to a first user. The first user can be a student, a learner, a trainee, and/or the like. Providing an authoring tool configured to generate the decision model, to generate the problem profile, and to associate the at least one learning module to a corresponding at least one of the plurality of decisions. The authoring tool may be used by a second user. The second user may be a teacher, a professor, a subject matter expert or the like. Provide a reporting and scoring interface configured to allow viewing of a progress of the first user. The reporting and scoring interface may also be configured to viewing, editing and reporting of a score associated with the first user (e.g., to the first user and/or the second user and/or a third party).

Computer-based instruction can emphasize the goal of learning concepts outside of an overarching real-world problem. The notion of learning concepts to make decisions within course content.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst particular combinations of features described herein, the scope of the present disclosure is not limited to the particular combinations, but instead extends to encompass any combination of features or embodiments herein disclosed irrespective of whether or not that particular combination has been specifically enumerated.

What is claimed is:

1. A decision based learning apparatus implemented by at least one processor and comprising:
    a decision module configured to implement a decision model associated with a domain of problems, the decision model being implemented as a decision tree including a plurality of decisions as nodes in the decision tree that represent a step-wise decision-making process of an expert for a plurality of problems,
        each of the plurality of decisions organized and retrieved according to conditional relationships in contrast to conceptual or procedural relationships,
        each of the plurality of decisions having two or more valid conditions each of which leads to one or more possible subsequent decision nodes until a final decision leading to problem resolution, wherein one of the plurality of decisions is included in a problem and a correct path is determined based on a problem type;
    a problem profile module configured to store a problem profile, the problem profile defining the problem type according to a set of conditions, wherein the correct path through the decision tree includes a resolution to the problem;
    a learning storage module configured to store at least one learning module associated with at least one of the plurality of decisions, the at least one learning module defining stored conditional information and related conceptual information to distinguish a condition present in the problem from a plurality of valid conditions at a decision node; and
    a decision scenario interface module configured to generate a scenario based on the decision model and the problem profile and to present the scenario based on the decision model and the problem profile in a graphical user interface (GUI), wherein
        the GUI is configured to interact with the decision based learning apparatus when a learner operates the GUI,
        the GUI is configured to configure the decision based learning apparatus when an instructor operates the GUI, and
        the decision scenario interface module is further configured to receive, via the GUI, input associated with a learner, interpret the input associated with the learner, and track a progress of the learner.

2. The decision based learning apparatus of claim 1, further comprising:
    an authoring interface module configured to elicit and to represent a conditional schema of an expert as a decision model, to generate the problem profile, and configured to associate the at least one learning module to a corresponding at least one of the plurality of decisions; and
    a reporting and scoring interface configured to allow viewing of a progress of a learner, and view, edit and report a score associated with the learner.

3. The decision based learning apparatus of claim 1, wherein
    the decision model corresponds to a decision-making process of a subject matter expert associated with solving the problem, and
    the decision model is based on a structure associated with a presentation of information for each of the of the plurality of decisions and a decision path corresponding to the presentation of information.

4. The decision based learning apparatus of claim 1, wherein
    the problem profile defines a structure of at least one scenario related to the solution of the problem, and
    the problem profile includes information related to a characteristic of the problem and an indication of a preferred path through the decision model.

5. The decision based learning apparatus of claim 1, wherein the at least one learning module includes a media file.

6. The decision based learning apparatus of claim 1, wherein one or more of the plurality of decisions define a decision path between the problem and the solution to the problem.

7. The decision based learning apparatus of claim 1, wherein the decision model, the problem profile and the scenario are implemented in a data-structure of a database.

8. A non-transitory computer readable medium including code segments that, when executed by a processor, cause the processor to:
    implement a decision model associated with solving a problem, the decision model including a plurality of model being implemented as a decision tree including a plurality of decisions as nodes in the decision tree,
    each of the plurality of decisions implementing stored conditional information associated with solving the problem, each of the plurality of decisions organized and retrieved according to conditional relationships in contrast to conceptual or procedural relationships,
    each of the plurality of decisions having:
        a correct answer linking to one of a solution to the problem or a first next decision in the plurality of decisions, the first next decision being associated with a first path in the decision tree, or
        at least one incorrect answer linking to a second next decision in the plurality of decisions, the second next decision being associated with a second path in the decision tree, the first path being a more direct path to the solution to the problem as compared to the second path;
    store a problem profile, the problem profile defining the problem and the solution to the problem;
    store at least one learning module associated with at least one of the plurality of decisions, the at least one learning module defining stored conceptual information associated with a corresponding one of the plurality of decisions, the at least one learning module defining conceptual information to distinguish a condition present in the problem from a plurality of valid conditions at a decision node;
    generate a scenario based on the decision model and the problem profile and to present the scenario based on the decision model and the problem profile in a graphical user interface (GUI);
    provide an authoring tool configured to generate the decision model, to generate the problem profile, and to associate the at least one learning module to a corresponding at least one of the plurality of decisions; and
    provide a reporting and scoring interface configured to allow viewing of a progress, view, edit and report a score on the GUI wherein the GUI is configured to interact with the decision based learning apparatus when a learner operates the GUI, the GUI is configured to configure the decision based learning apparatus when an instructor operates the GUI, and the decision scenario interface module is further configured to receive, via the GUI, input associated with a learner, interpret the input associated with the learner, and track a progress of the learner.

9. The non-transitory computer readable medium of claim 8, wherein the decision model corresponds to a decision-making process of a subject matter expert associated with solving the problem, and the decision model is based on an algorithmic structure associated with a presentation of information for each of the of the plurality of decisions and a decision path corresponding to the presentation of information.

10. The non-transitory computer readable medium of claim 8, wherein the problem profile defines a structure of at least one scenario related to the solution of the problem, and the problem profile includes information related to a characteristic of the problem and an indication of a preferred path through the decision model.

11. A decision based learning apparatus comprising:

a Decision-Based Learning Markup Language (DBLML) module configured to define:

at least one conditional data element of a given decision model, and to allow an instructor to markup language corresponding to an individual problem as an instance of the at least one conditional data element, the decision model being implemented as a decision tree including a plurality of decisions as nodes in the decision tree that represent a step-wise decision-making process of an expert for a plurality of problems, each of the plurality of decisions organized and retrieved according to conditional relationships in contrast to conceptual or procedural relationships, each of the plurality of decisions having two or more valid conditions each of which leads to one or more possible subsequent decision nodes until a final decision leading to problem resolution, wherein one of the plurality of decisions is included in a problem and a correct path is determined based on a problem type enabling the decision based learning apparatus to identify and process the marked up natural language string as a data element, and enabling the decision based learning apparatus to process the marked up natural language string as an interactive object, wherein the decision model includes a contextual component and an instructional component, the DBLML module is further configured to present the contextual component and the instructional component to a learner using a graphical user interface (GUI), the GUI is configured to allow the learner to interact with the decision based learning apparatus and the instructor to configure the decision based learning apparatus, and the DBLML module is further configured to receive, via the GUI, input associated with a learner, interpret the input associated with the learner, and track progress of the learner; and a learning storage module configured to store at least one learning module associated with at least one of the plurality of decisions, the at least one learning module defining stored conditional information and related conceptual information to distinguish a condition present in the problem from a plurality of valid conditions at a decision node.

12. The decision based learning apparatus of claim 11, wherein the decision model corresponds to a decision-making process of a subject matter expert associated with solving the problem, and the decision model is based on an algorithmic structure associated with a presentation of information for each of the of a plurality of decisions and a decision path corresponding to the presentation of information.

13. The decision based learning apparatus of claim 11, wherein a problem profile defines a structure of at least one scenario related to the solution of the problem, and the problem profile includes information related to a characteristic of the problem and an indication of a preferred path through the decision model.

14. The decision based learning apparatus of claim 11, wherein one or more of a plurality of decisions define a decision path between the problem and the solution to the problem.

15. The decision based learning apparatus of claim 11, wherein a decision model, a problem profile and the scenario are defined in a data-structure of a markup language file.

* * * * *